United States Patent
Osawa

(10) Patent No.: US 10,386,200 B2
(45) Date of Patent: Aug. 20, 2019

(54) MAP DISPLAY SYSTEM, METHOD, AND PROGRAM

(71) Applicant: AISIN AW CO., LTD., Anjo-shi, Aichi-ken (JP)

(72) Inventor: Yuichi Osawa, Nagoya (JP)

(73) Assignee: AISIN AW CO., LTD., Anjo-shi, Aichi (JP)

( * ) Notice: Subject to any disclaimer, the term of this patent is extended or adjusted under 35 U.S.C. 154(b) by 214 days.

(21) Appl. No.: 15/100,502

(22) PCT Filed: Jan. 5, 2015

(86) PCT No.: PCT/JP2015/050013
§ 371 (c)(1),
(2) Date: May 31, 2016

(87) PCT Pub. No.: WO2015/115120
PCT Pub. Date: Aug. 6, 2015

(65) Prior Publication Data
US 2016/0305793 A1     Oct. 20, 2016

(30) Foreign Application Priority Data

Jan. 28, 2014 (JP) ................................. 2014-013472

(51) Int. Cl.
*G01C 21/36* (2006.01)
(52) U.S. Cl.
CPC ....... *G01C 21/3667* (2013.01); *G01C 21/367* (2013.01); *G01C 21/3626* (2013.01)
(58) Field of Classification Search
CPC .............. G01C 21/3667; G01C 21/367; G01C 21/3626
See application file for complete search history.

(56) References Cited

U.S. PATENT DOCUMENTS 5,874,905 A * 2/1999 Nanba ................ G01C 21/3635
340/988

FOREIGN PATENT DOCUMENTS

JP     9-5101 A     1/1997
JP     9-62994 A     3/1997
(Continued)

OTHER PUBLICATIONS

International Search Report for PCT/JP2015/050013 dated Mar. 17, 2015 [PCT/ISA/210].

*Primary Examiner* — Kimberly S Berona
*Assistant Examiner* — Jordan S Fei
(74) *Attorney, Agent, or Firm* — Sughrue Mion, PLLC

(57) ABSTRACT

A technique for displaying a scale-changed view of a narrow-angle branch intersection in an easily visually recognizable manner through simple processing. A map display system that displays a map on a display section includes: narrow-angle branch intersection determination code for determining whether or not a guide target intersection is a narrow-angle branch intersection at which an intersection angle between roads is smaller than a predetermined threshold; and a scale-changed view display for displaying a scale-changed view, which is obtained by changing a scale of the guide target intersection included in the map such that a value obtained by dividing a horizontal scale change rate by a vertical scale change rate is larger than 1, on the display section in the case where the guide target intersection is the narrow-angle branch intersection.

4 Claims, 2 Drawing Sheets

(56) References Cited

FOREIGN PATENT DOCUMENTS

JP  11-83518 A  3/1999
JP  2010-203969 A  9/2010

* cited by examiner

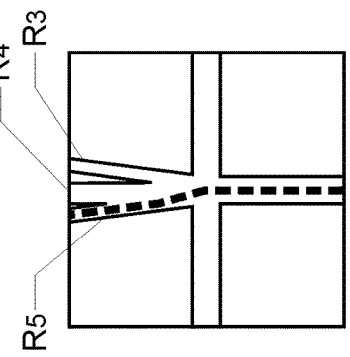
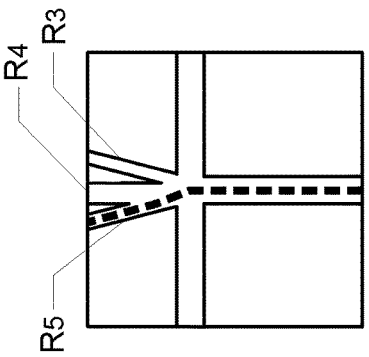
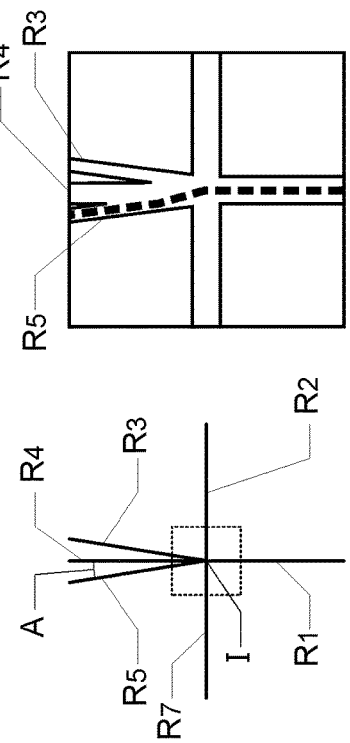
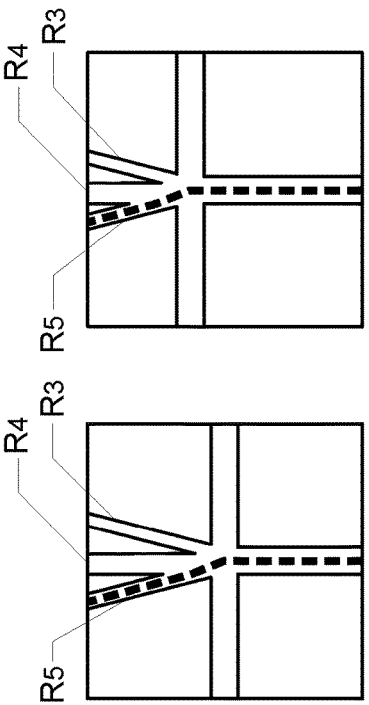
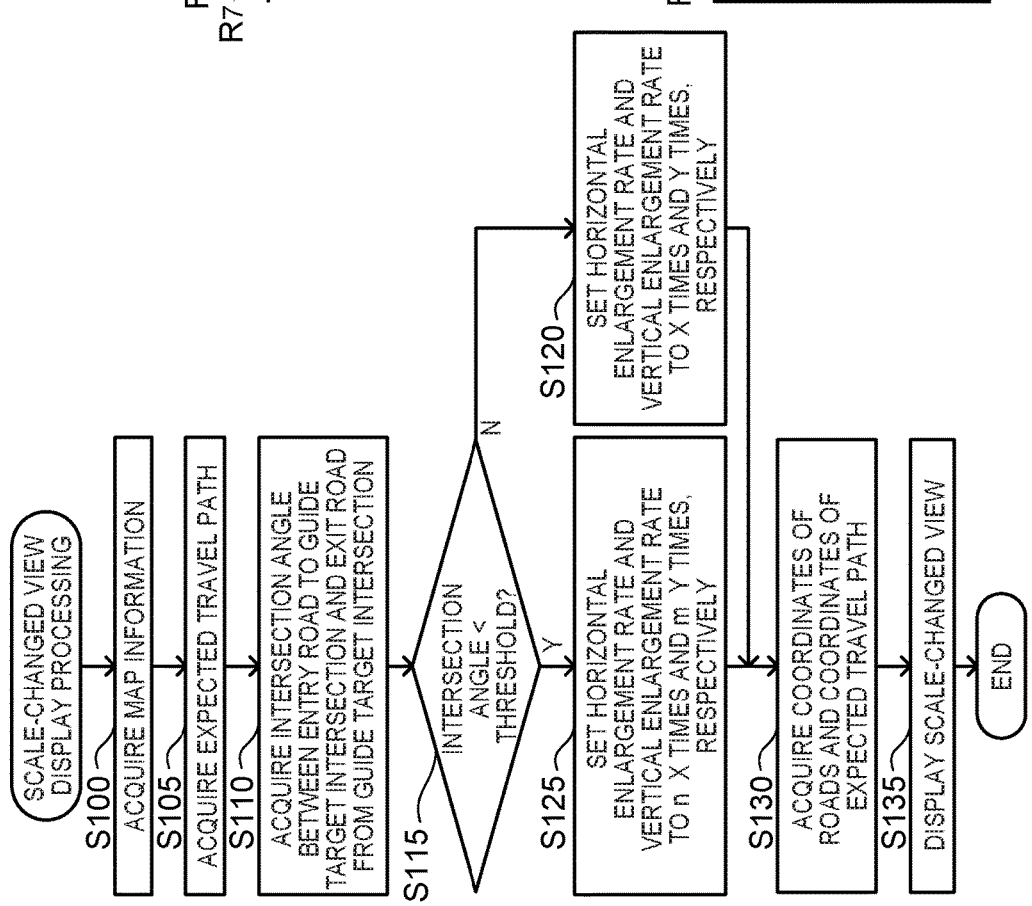

MAP DISPLAY SYSTEM, METHOD, AND PROGRAM

CROSS REFERENCE TO RELATED APPLICATIONS

This application is a National Stage of International Application No. PCT/JP2015/050013, filed on Jan. 5, 2015, which claims priority from Japanese Patent Application No. 2014-013472, filed on Jan. 28, 2014, the contents of all of which are incorporated herein by reference in their entirety.

TECHNICAL FIELD

The present disclosure relates to a map display system, method, and program.

BACKGROUND ART

In a navigation system that displays a map on a display section, there has hitherto been known a technique that displays a map of an area around an intersection as enlarged. For example, Patent Document 1 discloses a technique for preparing an enlarged view in which the angle formed by intersecting roads is widened to a predetermined angle when the angle formed by the intersecting roads is narrower than the predetermined angle.

RELATED-ART DOCUMENTS

Patent Documents

[Patent Document 1] Japanese Patent Application Publication No. 9-5101 (JP 9-5101 A)

SUMMARY

In order to widen the intersection angle of roads at an intersection to a predetermined angle as in the related art, it is necessary to specify an intersection angle of the roads stored in map information, specify an angle by which the direction of one or both of the roads is to be changed in order to widen the intersection angle to the predetermined angle, and draw an enlarged view in which the direction of the roads has been varied by the specified angle. Thus, a complicated process is required to draw such an image.

The present disclosure has been made in view of the foregoing issue, and therefore has an object to provide a technique for displaying an enlarged view of a narrow-angle branch intersection in an easily visually recognizable manner through a simple processing.

In order to achieve the foregoing object, the present disclosure provides a map display system that displays a map on a display section, including: narrow-angle branch intersection determination software code for determining whether or not a guide target intersection is a narrow-angle branch intersection at which an intersection angle between roads is smaller than a predetermined threshold; and a scale-changed view display for displaying a scale-changed view, which is obtained by changing a scale of the guide target intersection included in the map such that a value obtained by dividing a horizontal scale change rate by a vertical scale change rate is larger than 1, on the display section in the case where the guide target intersection is the narrow-angle branch intersection.

In order to achieve the foregoing object, the present disclosure also provides a map display method of displaying a map on a display section, including: a narrow-angle branch intersection determination step of determining whether or not a guide target intersection is a narrow-angle branch intersection at which an intersection angle between roads is smaller than a predetermined threshold; and a scale-changed view display step of displaying a scale-changed view, which is obtained by changing a scale of the guide target intersection included in the map such that a value obtained by dividing a horizontal scale change rate by a vertical scale change rate is larger than 1, on the display section in the case where the guide target intersection is the narrow-angle branch intersection.

In order to achieve the foregoing object, the present disclosure further provides a map display program that causes a computer to implement a function of displaying a map on a display section, the map display program causing the computer to implement: a narrow-angle branch intersection determination function of determining whether or not a guide target intersection is a narrow-angle branch intersection at which an intersection angle between roads is smaller than a predetermined threshold; and a scale-changed view display function of displaying a scale-changed view, which is obtained by changing a scale of the guide target intersection included in the map such that a value obtained by dividing a horizontal scale change rate by a vertical scale change rate is larger than 1, on the display section in the case where the guide target intersection is the narrow-angle branch intersection.

In the map display system, method, and program, as described above, a scale-changed view, which is obtained by changing the scale of the guide target intersection included in the map such that a value obtained by dividing the horizontal scale change rate by the vertical scale change rate is larger than 1, is displayed on the display section in the case where the guide target intersection is the narrow-angle branch intersection. That is, in the scale-changed view in which the horizontal scale change rate is higher than the vertical scale change rate, narrow-angle branch roads are displayed with the angle between the narrow-angle branch roads widened even if the narrow-angle branch roads are arranged side by side in the horizontal direction. This makes it easier to distinguish the narrow-angle branch roads. In addition, the scale-changed view can be drawn by simply adjusting the scale change rates. Thus, it is possible to display the scale-changed view of the narrow-angle branch intersection in an easily visually recognizable manner through simple processing.

BRIEF DESCRIPTION OF THE DRAWINGS

FIG. 2A is a flowchart illustrating scale-changed view display processing, FIG. 2B illustrates roads around a guide target intersection, and FIGS. 2C to 2E each illustrate an example of a scale-changed view.

DETAILED DESCRIPTION OF THE PREFERRED EMBODIMENT

Figure 1:
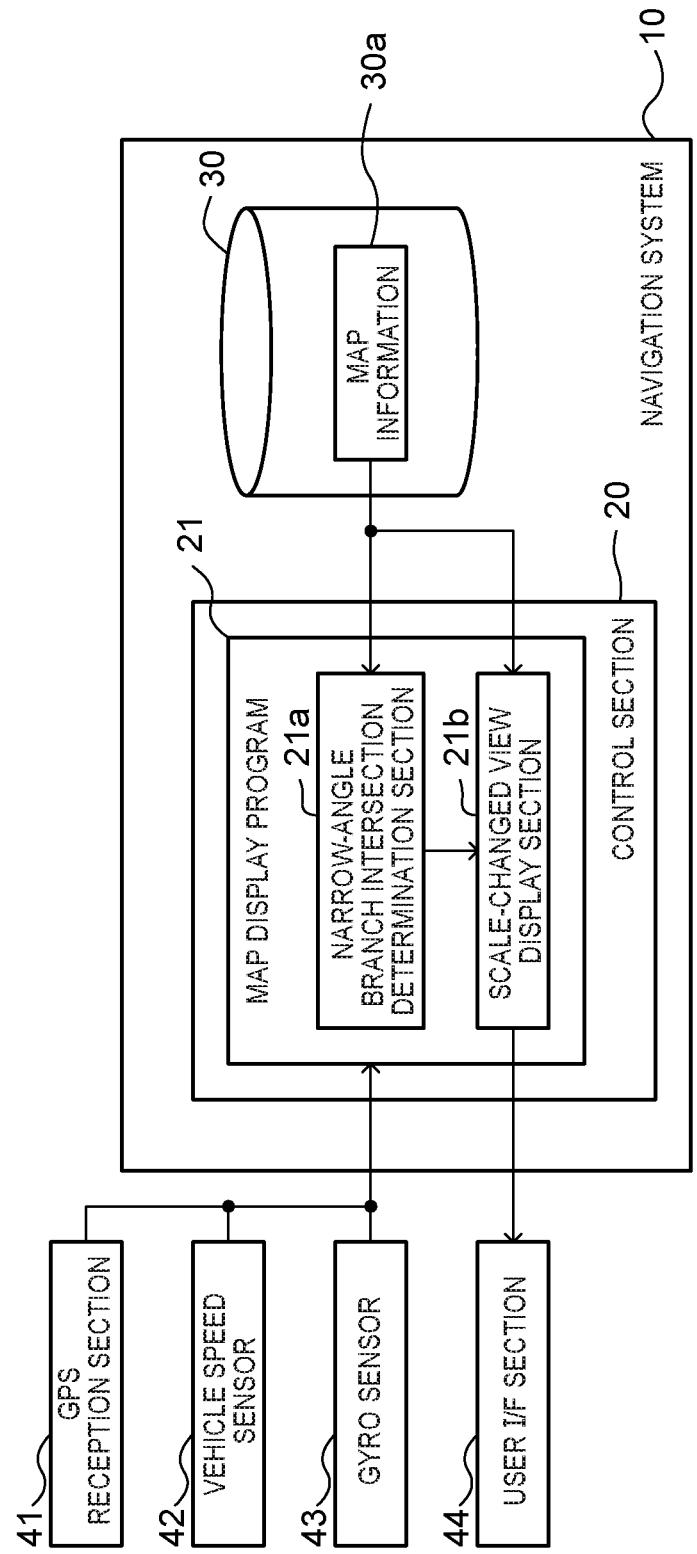
FIG. 1 is a block diagram illustrating a map display system.

An embodiment of the present disclosure will be described below in the following order:
(1) Configuration of Navigation System
(1-1) Scale-changed View Display Process
(2) Other Embodiments
    (1) Configuration of Navigation System FIG. 1 is a block diagram illustrating the configuration of a navigation system that includes a map display system according to an embodiment of the present disclosure. The navigation system 10 includes a control section 20 that includes a CPU, a RAM, a ROM, and so forth. The control section 20 can execute programs stored in the ROM. In the embodiment, a navigation program can be executed as one of the programs. A storage medium 30 stores map information 30a. The map information 30a includes node data that indicate the position etc. of nodes corresponding to end points of roads on which the vehicle travels, shape interpolation point data that indicates the position etc. of shape interpolation points for specifying the shape of the roads between the nodes, link data that indicate coupling between the nodes, facility data that indicate facilities that are present around the roads, and so forth. The link data are correlated with information that indicates the attribute (such as a highway or a general road) of the roads.

The vehicle according to the embodiment includes a GPS reception section 41, a vehicle speed sensor 42, a gyro sensor 43, and a user I/F section 44. The GPS reception section 41 receives radio waves from GPS satellites to output a signal for calculating the current position of the vehicle via an interface (not illustrated). The vehicle speed sensor 42 outputs a signal corresponding to the rotational speed of wheels of the vehicle. The control section 20 acquires the signal via an interface (not illustrated) to acquire the vehicle speed. The gyro sensor 43 detects the angular acceleration of gyration of the vehicle in a horizontal plane to output a signal corresponding to the orientation of the vehicle. The control section 20 acquires the signal to acquire the travel direction of the vehicle. The control section 20 acquires the current position of the vehicle by specifying the travel track of the vehicle on the basis of an output signal from the vehicle speed sensor 42, the gyro sensor 43, and so forth. The output signal from the GPS reception section 41 is utilized to correct, for example, the current position of the vehicle specified by the vehicle speed sensor 42, the gyro sensor 43, and so forth. The user I/F section 44 is an interface section that receives input of a command from the driver and that provides various kinds of information to the driver, and includes a display section constituted of a touch panel display (not illustrated), an input section such as a switch, and a sound output section such as a speaker.

The navigation program is a program module that causes the control section 20 to implement a function of guiding the vehicle. That is, through processing performed by the navigation program, the control section 20 searches for an expected travel path from the current location to a destination location designated by a user, and guides the vehicle along the expected travel path while displaying a map of an area around the current location and the expected travel path on the display section of the user I/F section 44 to guide the user to the destination location. In order to display a map on the display section, the navigation program includes a map display program 21. The control section 20 specifies the current location of the vehicle (the current location of the navigation system 10) on the road through processing performed by the navigation program, and displays the current location on the map through processing performed by the map display program 21. In the case where the expected travel path is set, through processing performed by the navigation program, the control section 20 determines an intersection that is directly ahead of the vehicle as the guide target intersection, and provides guidance on the travel direction.

(1-1) Scale-changed View Display Process

In the embodiment, as an example of the guidance on the travel direction, an enlarged view of the guide target intersection is displayed on the display section, and the expected travel path is displayed in the enlarged view. That is, in the embodiment, a scale change is performed through enlargement. In order to display an enlarged view, the map display program 21 includes a narrow-angle branch intersection determination section 21a and a scale-changed view display section 21b. FIG. 2A is a flowchart of a scale-changed view display processing executed by the map display program 21. The scale-changed view display processing is executed by the control section 20 in the case where the distance between the vehicle and the guide target intersection is equal to or less than a predetermined distance.

The narrow-angle branch intersection determination section 21a is a program module that causes the control section 20 to implement a function of determining whether or not the guide target intersection is a narrow-angle branch intersection. That is, in the case where three or more roads are connected to the guide target intersection and the intersection angle between two adjacent roads (the value of one of the intersection angles with a smaller absolute value) is narrow, a map that indicates the guide target intersection is not easily visually recognizable. Thus, in the embodiment, such a guide target intersection is determined as a narrow-angle branch intersection, and an enlarged view of a map of the narrow-angle branch intersection is displayed with a horizontal enlargement rate and a vertical enlargement rate adjusted.

To this end, through processing performed by the narrow-angle branch intersection determination section 21a, the control section 20 determines that the guide target intersection is a narrow-angle branch intersection in the case where the intersection angle between an entry road to the guide target intersection and an exit road from the guide target intersection is smaller than a threshold. Specifically, the control section 20 references the storage medium 30 to acquire map information 30a (step S100), and acquires an expected travel path specified through processing performed by the navigation program (step S105). Furthermore, the control section 20 acquires an intersection angle between an entry road to the guide target intersection and an exit road from the guide target intersection (step S110). That is, the control section 20 specifies roads determined as the expected travel path on the basis of the map information 30a. Furthermore, the control section 20 specifies a road on the expected travel path for entry to the guide target intersection as the entry road, and specifies a road on the expected travel path for exit from the guide target intersection as the exit road. Furthermore, the control section 20 acquires directions defined by connecting nodes corresponding to end points of the entry road and the exit road (in the case where shape interpolation points are present, directions defined by connecting a node that indicates the guide target intersection and a shape interpolation point that is the closest to the node) as the direction of the entry road and the direction of the exit road. The control section 20 then acquires one of the intersection angles between the direction of the entry road and the direction of the exit road with a smaller absolute value as the intersection angle between the entry road and the exit road.

Next, the control section 20 determines whether or not the intersection angle is smaller than a threshold (step S115). That is, the control section 20 determines that the guide target intersection is a narrow-angle branch intersection in the case where the intersection angle is smaller than the threshold, and the control section 20 determines that the guide target intersection is not a narrow-angle branch intersection in the case where the intersection angle is not smaller than the threshold. FIG. 2B illustrates an example of a guide target intersection I and roads around the guide target intersection I. In FIG. 2B, roads $R_1$ to $R_7$ connected to the guide target intersection I are schematically illustrated by solid lines. In the example, in the case where the road $R_1$ is the entry road to the guide target intersection I and the road $R_5$ is the exit road from the guide target intersection I, the intersection angle is an angle A indicated in FIG. 2B, because the road $R_1$ and the road $R_4$ are on the same line. Thus, the guide target intersection I is determined as a narrow-angle branch intersection if the angle A is smaller than a predetermined threshold. The threshold is a value determined in advance and used to determine that the intersection angle between roads is a narrow angle, the value is and is assumed to be 15° or the like, for example.

The scale-changed view display section 21b is a program module that causes the control section 20 to implement a function of displaying a scale-changed view, which is obtained by changing the scale of the guide target intersection included in a map such that a value obtained by dividing the horizontal scale change rate by the vertical scale change rate is larger than 1 in the case where the guide target intersection is a narrow-angle branch intersection. Specifically, in the case where it is not determined in step S115 that the intersection angle is smaller than the threshold, the control section 20 determines that the guide target intersection I is not a narrow-angle branch intersection, and sets the horizontal enlargement rate and the vertical enlargement rate to X times and Y times, respectively (step S120). Here, X and Y are each a magnification of 1 or more determined in advance, and may be determined as X=5 and Y=5, for example.

In the case where it is determined in step S115 that the intersection angle is smaller than the threshold, on the other hand, the control section 20 determines that the guide target intersection I is a narrow-angle branch intersection, and sets the horizontal enlargement rate and the vertical enlargement rate to n×X times and m×Y times, respectively (step S125). Here, n and m are each a magnification of 1 or more determined in advance, and n is larger than m. That is, in the embodiment, the horizontal enlargement rate and the vertical enlargement rate in an enlarged view for a case where the guide target intersection is not a narrow-angle branch intersection are n and m, respectively, based on an enlarged view for a case where the guide target intersection is not a narrow-angle branch intersection. Since n/m is larger than 1, an enlarged view is enlarged such that a value obtained by dividing the horizontal enlargement rate by the vertical enlargement rate is larger than 1 in the case where the guide target intersection is a narrow-angle branch intersection. For the values of n and m, values such as n=4 and m=2 may be used.

In the embodiment, a map of an area around the guide target intersection I is extracted from a map displayed on the display section of the user I/F section 44 in a normal state to be displayed as an enlarged view. In the enlarged view, roads are displayed with a width prescribed for each road type. Specifically, when the horizontal enlargement rate and the vertical enlargement rate are set in step S120 or S125, through processing performed by the scale-changed view display section 21b, the control section 20 acquires coordinates of the roads and coordinates of the expected travel path in the enlarged view (step S130).

That is, the control section 20 sets a virtual orthogonal coordinate system in which the guide target intersection I is defined as the origin of the coordinate system, the front-rear direction of the vehicle is defined as the up-down direction (vertical direction) of the coordinate system, and the left-right direction of the vehicle is defined as the left-right direction (horizontal direction) of the coordinate system.

Moreover, the control section 20 references the map information 30a to specify coordinates of end points (a node that indicates the guide target intersection I and a node on the opposite side) of roads connected to the guide target intersection I in the orthogonal coordinate system. It should be noted, however, that in the case of a road that includes shape interpolation points, coordinates of a node that indicates the guide target intersection I and a shape interpolation point that is the closest to the node are specified as the coordinates of the end points. The control section 20 also acquires coordinates of end points of roads corresponding to the entry road to the guide target intersection I and the exit road from the guide target intersection I in the expected travel path as the coordinates of the expected travel path. The unit distance in the orthogonal coordinate system assumed here is the same as the unit distance at the scale of the map currently displayed on the display section of the user I/F section 44. Thus, when a map is drawn on the basis of the coordinates specified as discussed above, the map currently displayed on the display section of the user I/F section 44 is displayed as not enlarged. Thus, the control section 20 multiplies the horizontal coordinate value of the coordinate of each end point by the horizontal enlargement rate (X or n×X), and multiplies the vertical coordinate value of the coordinate of each end point by the vertical enlargement rate (Y or n×Y). Consequently, the map is displayed as enlarged with the enlargement rates set in step S120 or step S125.

Next, through processing performed by the scale-changed view display section 21b, the control section 20 displays an enlarged view (step S135). That is, the control section 20 acquires the attribute of each road on the basis of the map information 30a. In addition, the control section 20 references the coordinates of each end point specified in the virtual orthogonal coordinate system in step S130, and generates image data for drawing a solid line that connects between the coordinates of the end points of a road and having a width determined in advance for each attribute of the road. Furthermore, the control section 20 corrects the image data such that a line that connects between the coordinates of the end points of the expected travel path and having a prescribed width and form (such as a broken line, for example) is superimposed on an image indicated by the image data. Furthermore, the control section 20 extracts data of a size for display as an enlarged view from the corrected image data, and outputs the extracted data to the display section of the user I/F section 44. As a result, an enlarged view is displayed on the display section of the user I/F section 44.

FIG. 2C illustrates an example of a view in which an area around the guide target intersection I indicated in FIG. 2B (by the broken line) is illustrated at a horizontal enlargement rate X of 1 and a vertical enlargement rate Y. Meanwhile, FIG. 2D illustrates an example of an enlarged view in which an area around the guide target intersection I indicated in FIG. 2B is enlarged at a horizontal enlargement rate n×X of 4 and a vertical enlargement rate m×Y of 2. In such examples, the roads are indicated by the white solid lines, and the expected travel path is indicated by the broken line.

In the case where the guide target intersection I is a narrow-angle branch intersection as indicated in such examples, the roads $R_3$ to $R_5$, which are narrow-angle branch roads, are drawn in a narrow region and difficult to distinguish in a view in which the horizontal enlargement rate and the vertical enlargement rate are equal to each other as illustrated in FIG. 2C. In an enlarged view (a scale-changed view for which a value obtained by dividing the horizontal scale change rate by the vertical scale change rate is larger than 1) in which the enlargement rates are set such that the horizontal enlargement rate is higher than the vertical enlargement rate with reference to the view illustrated in FIG. 2C, as illustrated in FIG. 2D, the intersection angle between the roads $R_3$ to $R_5$, which are narrow-angle branch roads, is widened, and the roads are drawn in a wide region as compared to FIG. 2C. This makes it easier to distinguish the narrow-angle branch roads. The enlarged view illustrated in FIG. 2D can be drawn in the same procedures as the enlarged view illustrated in FIG. 2C by simply adjusting the enlargement rates. Thus, it is possible to display an enlarged view of a narrow-angle branch intersection in an easily visually recognizable manner through simple processing.

In the embodiment, further, the horizontal enlargement rate and the vertical enlargement rate are X times and Y times, respectively, in the case where the guide target intersection I is not a narrow-angle branch intersection, and the horizontal enlargement rate and the vertical enlargement rate are n×X times and m×Y times, respectively, in the case where the guide target intersection I is a narrow-angle branch intersection. In the example illustrated in FIG. 2D, n is 4 and m is 2. Thus, in the example, the enlargement rates are increased in both the vertical direction and the horizontal direction in the case where the guide target intersection I is a narrow-angle branch intersection as compared to a case where the guide target intersection I is not a narrow-angle branch intersection. As a result, roads can be displayed in an easily distinguishable manner at a narrow-angle branch intersection as compared to intersections that are not a narrow-angle branch intersection.

(2) Other Embodiments

The embodiment described above is an example for carrying out the present disclosure, and a variety of other embodiments can be adopted as long as a scale-changed view is displayed such that a value obtained by dividing the horizontal scale change rate by the vertical scale change rate is larger than 1 in the case where the guide target intersection is a narrow-angle branch intersection. For example, the navigation system 10 may be permanently mounted on the vehicle as in the embodiment discussed above, or may be a portable navigation system 10 that can be brought into the vehicle to be utilized. As a matter of course, the present disclosure may also be applied to a navigation system that provides guidance on a path for an entity other than the vehicle, e.g. a walker. Furthermore, some of the functions executed by the control section 20 may be executed by another device, e.g. the display section of the user I/F section 44.

Moreover, the map display system may be a system that displays a map on a display section, and that displays a map of an area around the current location or a location designated by the user. For example, the map display system may be a portable terminal or the like.

The narrow-angle branch intersection determination software code may only be capable of determining whether or not the guide target intersection is a narrow-angle branch intersection. That is, in the case where the map display system provides guidance on an intersection such as an expected travel path around an intersection, the intersection on which guidance is to be provided is specified as the guide target intersection. Furthermore, in the case where three or more roads are connected to the guide target intersection and the intersection angle between two adjacent roads (the value of one of the intersection angles with a smaller absolute value) is narrow, a map that indicates the guide target intersection is not easily visually recognizable. Therefore, such a guide target intersection is determined as a narrow-angle branch intersection, and a scale-changed view of a map of the narrow-angle branch intersection is displayed with the horizontal scale change rate and the vertical scale change rate adjusted.

The narrow-angle branch intersection determination software code may only be capable of determining whether or not the guide target intersection is a narrow-angle branch intersection. For example, the narrow-angle branch intersection determination software code may be configured to determine whether or not the guide target intersection is a narrow-angle branch intersection on the basis of map information that indicates roads, a track of movement at the guide target intersection in the past, or the like. Here, the narrow-angle branch intersection determination software code may only be capable of determining at least a guide target intersection at which the intersection angle between two adjacent roads is narrow as a narrow-angle branch intersection, and may erroneously determine an intersection at which the intersection angle between two adjacent roads is not narrow as a narrow-angle branch intersection. This is because no actual harm will be given to the user even if a scale-changed view of such an intersection is displayed such that a value obtained by dividing the horizontal scale change rate by the vertical scale change rate is larger than 1.

A variety of techniques can be adopted as a technique for determining whether or not the guide target intersection is a narrow-angle branch intersection. For example, the guide target intersection may be determined as a narrow-angle branch intersection in the case where the intersection angle between the entry road to the guide target intersection and the exit road from the guide target intersection is smaller than a threshold determined in advance to determine that the intersection angle is a narrow angle. Alternatively, the intersection angle between adjacent roads may be acquired, and the guide target intersection may be determined as a narrow-angle branch intersection in the case where the acquired intersection angle is smaller than a threshold determined in advance to determine that the intersection angle is a narrow angle. Roads, the intersection angle between which is to be acquired, may be specified by a variety of techniques. An exit road that forms an intersection angle within a predetermined range with the exit direction from an intersection may be specified as a target road. An exit road that forms an intersection angle within a predetermined range with the entry direction to an intersection may be specified as a target road. A road that is adjacent to a road on which the vehicle is expected to exit from an intersection may be specified as a target road.

The scale-changed view display may only be capable of displaying a scale-changed view, which is obtained by changing the scale of the guide target intersection included in a map such that a value obtained by dividing the horizontal scale change rate by the vertical scale change rate is larger than 1 in the case where the guide target intersection is a narrow-angle branch intersection. That is, the scale-changed view display may only be capable of displaying a scale-changed view in which the interval between narrow-angle branch roads arranged side by side in the horizontal direction is widened so that the narrow-angle branch roads are easily distinguishable from each other. The scale change rates may be determined in advance. The scale change rates may be determined with reference to a state in which a map of the guide target intersection is already displayed on the display section, or may be determined with reference to a scale-changed view for a case where the guide target intersection is not a narrow-angle branch intersection.

That is, the scale-changed view display changes the scale with reference to the guide target intersection included in a map. Here, the guide target intersection included in a map may be the guide target intersection before a scale change, or may be the guide target intersection in a scale-changed view displayed in the case where the guide target intersection is not a narrow-angle branch intersection.

Specifically, for the former, the scale-changed view display is configured to display a scale-changed view obtained by changing the scale of the guide target intersection included in a map using the scale change rate based on the map displayed on the display section, and further to display the scale-changed view with the scale changed such that a value obtained by dividing the horizontal scale change rate by the vertical scale change rate is larger than 1 in the case where the guide target intersection is a narrow-angle branch intersection when the scale-changed view is to be displayed.

For the latter, the scale-changed view display is configured to display a scale-changed view obtained by changing the scale of the guide target intersection included in a map displayed on the display section, and to display a scale-changed view, which is obtained by further changing the scale of the above scale-changed view such that a value obtained by dividing the scale change rate in the horizontal direction by the scale change rate in the vertical direction is larger than 1, on the display section in the case where the guide target intersection is not a narrow-angle branch intersection.

In the configuration (former) in which the scale change rates are determined with reference to a state in which a map of the guide target intersection is already displayed on the display section, the map being displayed (before a scale change) is used as the reference. Therefore, in the example indicated in step S125 etc. discussed above, the scale change rates are set such that the horizontal scale change rate is n×X, the vertical scale change rate is m×Y, and n×X/m×Y is larger than 1. In this case, roads are displayed as widened in the horizontal direction as compared to a map before a scale change, and therefore narrow-angle branch roads are easily visually recognizable in the scale-changed view as compared to the map before the scale change.

As a matter of course, roads of a narrow-angle branch intersection can be made relatively easily visually recognizable as compared to a reference by displaying a scale-changed view, which is obtained by changing the scale of the guide target intersection included in a map such that a value obtained by dividing the horizontal scale change rate by the vertical scale change rate is larger than 1, when a scale change corresponds to a reduction, rather than an enlargement. For example, in the case where n is 0.8 and m is 0.6 in step S120 discussed above, a scale change means a reduction. Because n/m is larger than 1, the scale-changed view after a reduction is relatively larger in the horizontal direction than in the vertical direction, and narrow-angle branch roads are easily visually recognizable as compared to a case where n/m is equal to or smaller than 1.

Moreover, the horizontal scale change rate and the vertical scale change rate may be constant values, or may be values that are variable in accordance with a variety of conditions. Furthermore, the scale-changed view, which is obtained by changing the scale of the guide target intersection included in a map, may be a scale-changed view of a map displayed normally, or may be a scale-changed view of a simple map. Examples of the scale-changed view of a simple map are assumed to include a scale-changed view in which roads are illustrated but at least some of facilities around the roads are not illustrated. Additionally, in the case where the guide target intersection is not a narrow-angle branch intersection, a scale-changed view may be displayed, or may not be displayed. In the case where a scale-changed view is displayed, the horizontal scale change rate in the scale-changed view may be higher than the vertical scale change rate, or may not be higher than the vertical scale change rate (e.g. the horizontal scale change rate and the vertical scale change rate may be equal to each other). The directions "vertical" and "horizontal" may be defined with reference to the display section. The up-down direction of the display section may be determined as the vertical direction, the plumb direction on the display section may be determined as the vertical direction, or a prescribed direction (e.g. a direction set as the north-south direction) on the display section may be determined as the vertical direction. The horizontal direction may be a direction that is perpendicular to the up-down direction.

Moreover, the scale-changed view display may be configured to display the guide target intersection in a scale-changed view on the forward side in the travel direction in the case where the guide target intersection is a narrow-angle branch intersection as compared to a case where the guide target intersection is not a narrow-angle branch intersection. That is, a configuration in which a scale-changed view of the guide target intersection is displayed in both the case where the guide target intersection is a narrow-angle branch intersection and the case where the guide target intersection is not a narrow-angle branch intersection is assumed here. In the configuration, the scale-changed view is displayed such that the position of the guide target intersection in the scale-changed view for a case where the guide target intersection is a narrow-angle branch intersection is on the forward side in the travel direction with respect to the position of the guide target intersection in the scale-changed view for a case where the guide target intersection is not a narrow-angle branch intersection.

FIG. 2E illustrates an example of a scale-changed view in which an area around the guide target intersection I illustrated in FIG. 2B (by the broken line) has been subjected to a scale change at a horizontal scale change rate n×X of 4 and a vertical scale change rate m×Y of 2 and in which further the guide target intersection I is disposed above the center of the scale-changed view (e.g. by 10 dots). That is, in the example illustrated in FIG. 2B, the entry road to the guide target intersection I is the road $R_1$, and the guide target intersection I is displayed in the upper portion, which is on the forward side in the travel direction with respect to the center, of the scale-changed view. In a configuration in which the scale-changed view of roads illustrated in FIG. 2B is illustrated as in FIG. 2E in the case where the guide target intersection I is a narrow-angle branch intersection, the scale-changed view of roads illustrated in FIG. 2B is illustrated as in FIG. 2C in the case where the guide target intersection I is not a narrow-angle branch intersection. Thus, in the configuration, the entry road to the guide target intersection is displayed to be long in length in the scale-changed view in the case where the guide target intersection is a narrow-angle branch intersection as compared to a case where the guide target intersection is not a narrow-angle branch intersection. As a result, preparations can be made in good time before the current location becomes closer to the guide target intersection.

Furthermore, the scale-changed view display may be configured to display a scale-changed view as enlarged horizontally and vertically in the case where the guide target intersection is a narrow-angle branch intersection as compared to a case where the guide target intersection is not a narrow-angle branch intersection. In the configuration, the scale-changed view is enlarged in both vertically and horizontally in the case where the guide target intersection is a narrow-angle branch intersection as compared to a case where the guide target intersection is not a narrow-angle branch intersection, and therefore roads can be displayed in an easily distinguishable manner at the narrow-angle branch intersection as compared to a case where the guide target intersection is not a narrow-angle branch intersection.

Furthermore, the technique for displaying a scale-changed view, which is obtained by changing the scale of the guide target intersection included in a map such that a value obtained by dividing the horizontal scale change rate by the vertical scale change rate is larger than 1, in the case where the guide target intersection is a narrow-angle branch intersection as in the present disclosure can also be implemented as a program or a method. In addition, it can be assumed that the system, program, and method described above are implemented as a single device or implemented by a plurality of devices, and the system, program, and method include a variety of aspects. For example, a navigation system, method, and program that include the elements described above can be provided. Various changes may be made. For example, some units may be implemented using software, and the others may be implemented using hardware. The present disclosure may also be implemented as a storage medium for a program that controls the system. As a matter of course, the storage medium for the software may totally equally be a magnetic storage medium, a magneto-optical storage medium, or any storage medium that may be developed in the future.

DESCRIPTION OF THE REFERENCE NUMERALS

10 Navigation System
20 Control Section
21 Map Display Program
21a Narrow-Angle Branch Intersection Determination Section
21b Scale-Changed View Display Section
30 Storage Medium
30a Map Information
41 GPS Reception Section
42 Vehicle Speed Sensor
43 Gyro Sensor
44 User I/F Section

The invention claimed is:

1. A map display system that displays a map on a display section, the map display system comprising:
   narrow-angle branch intersection determination software code for determining whether or not a guide target intersection is a narrow-angle branch intersection at which an intersection angle between roads is smaller than a predetermined threshold; and
   a scale-changed view display for displaying a scale-changed view, which is obtained by changing a scale of the guide target intersection included in the map such that a value obtained by dividing a horizontal scale change rate by a vertical scale change rate is larger than 1, on the display section in the case where the guide target intersection is the narrow-angle branch intersection, wherein the scale-changed view display displays the guide target intersection in the scale-changed view at a position that is shifted forward in a travel direction such that more of an entry road is shown in the case where the guide target intersection is the narrow-angle branch intersection as compared to the case where the guide target intersection is not the narrow-angle branch intersection, thereby providing a driver more time to prepare for the narrow-angle branch intersection than for the case that the guide target intersection is not the narrow-angle branch intersection.

2. The map display system according to claim 1, wherein the scale-changed view display displays the scale-changed view as enlarged horizontally and vertically in the case where the guide target intersection is the narrow-angle branch intersection as compared to the case where the guide target intersection is not the narrow-angle branch intersection.

3. A map display method of displaying a map on a display section, the map display method comprising:
   a narrow-angle branch intersection determination step of determining whether or not a guide target intersection is a narrow-angle branch intersection at which an intersection angle between roads is smaller than a predetermined threshold; and
   a scale-changed view display step of displaying a scale-changed view, which is obtained by changing a scale of the guide target intersection included in the map such that a value obtained by dividing a horizontal scale change rate by a vertical scale change rate is larger than 1, on the display section in the case where the guide target intersection is the narrow-angle branch intersection, wherein the scale-changed view display displays the guide target intersection in the scale-changed view at a position that is shifted forward in a travel direction such that more of an entry road is shown in the case where the guide target intersection is the narrow-angle branch intersection as compared to the case where the guide target intersection is not the narrow-angle branch intersection, thereby providing a driver more time to prepare for the narrow-angle branch intersection than for the case that the guide target intersection is not the narrow-angle branch intersection.

4. A non-transitory computer readable medium storing a map display program that causes a computer to implement a function of displaying a map on a display section, the map display program causing the computer to implement:
   a narrow-angle branch intersection determination function of determining whether or not a guide target intersection is a narrow-angle branch intersection at which an intersection angle between roads is smaller than a predetermined threshold; and
   a scale-changed view display function of displaying a scale-changed view, which is obtained by changing a scale of the guide target intersection included in the map such that a value obtained by dividing a horizontal scale change rate by a vertical scale change rate is larger than 1, on the display section in the case where the guide target intersection is the narrow-angle branch intersection, wherein the scale-changed view display displays the guide target intersection in the scale-changed view at a position that is shifted forward in a travel direction such that more of an entry road is shown in the case where the guide target intersection is the narrow-angle branch intersection as compared to the case where the guide target intersection is not the narrow-angle branch intersection, thereby providing a driver more time to prepare for the narrow-angle branch intersection than for the case that the guide target intersection is not the narrow-angle branch intersection.

* * * * *